(12) United States Patent
Wang et al.

(10) Patent No.: US 10,508,223 B2
(45) Date of Patent: Dec. 17, 2019

(54) EASY-TEAR STICKER AND PROTECTIVE FILM ASSEMBLY

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Liantao Wang, Beijing (CN); Peihuan Ning, Beijing (CN); Guangchao Wei, Beijing (CN); Jing Huang, Beijing (CN); Shengnan Wang, Beijing (CN); Chenglong Pan, Beijing (CN); Guanglin Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/765,389

(22) PCT Filed: Sep. 30, 2017

(86) PCT No.: PCT/CN2017/104813
§ 371 (c)(1),
(2) Date: Apr. 2, 2018

(87) PCT Pub. No.: WO2018/188286
PCT Pub. Date: Oct. 18, 2018

(65) Prior Publication Data
US 2019/0062599 A1 Feb. 28, 2019

(30) Foreign Application Priority Data

Apr. 14, 2017 (CN) .................... 2017 2 0390211 U

(51) Int. Cl.
*B32B 7/12* (2006.01)
*C09J 7/20* (2018.01)
(Continued)

(52) U.S. Cl.
CPC . *C09J 7/20* (2018.01); *C09J 7/30* (2018.01);
*G09F 3/10* (2013.01); *B32B 7/12* (2013.01);
(Continued)

(58) Field of Classification Search
CPC .... B32B 7/12; B32B 7/14; B32B 3/08; G06F 2203/04107; Y10T 428/14; Y10T 428/28;
(Continued)

(56) References Cited

FOREIGN PATENT DOCUMENTS

| CN | 2842483 Y | 11/2006 |
|---|---|---|
| CN | 103865424 A | 6/2014 |

(Continued)

OTHER PUBLICATIONS

International Search Report and Written Opinion dated Jan. 10, 2013; PCT/CN2017/104813.

*Primary Examiner* — Alexander S Thomas
(74) *Attorney, Agent, or Firm* — Ladas & Parry LLP

(57) ABSTRACT

An easy-tear sticker and a protective film assembly are provided. The easy-tear sticker includes: a main body layer and a first adhesive layer, the main body layer includes an attaching part and a tearing part, and the first adhesive layer is disposed on the attaching part, the attaching part includes a first attaching area and a second attaching area, a shape of the first attaching area is a right-angle triangle, and a shape of the second attaching area is a strip; the tearing part is connected to the attaching part by a first right-angle side of the right-angle triangle, and the tearing part is configured to be folded toward the attaching part along the first right-angle side, so as to cover a surface of the attaching part facing away from the first adhesive layer.

17 Claims, 6 Drawing Sheets

(51) Int. Cl.
    *C09J 7/30*           (2018.01)
    *G09F 3/10*           (2006.01)
    *B32B 7/14*           (2006.01)

(52) U.S. Cl.
    CPC ........... *B32B 7/14* (2013.01); *C09J 2201/122* (2013.01); *C09J 2201/28* (2013.01); *C09J 2203/334* (2013.01); *Y10T 428/14* (2015.01); *Y10T 428/28* (2015.01)

(58) Field of Classification Search
    CPC ........ C09J 7/02; C09J 7/20; C09J 9/00; B65B 69/00
    See application file for complete search history.

(56) References Cited

FOREIGN PATENT DOCUMENTS

| | | |
|---|---|---|
| CN | 106113718 A | 11/2016 |
| CN | 206031979 U | 3/2017 |
| JP | 3200045 U | 9/2015 |
| WO | 2005/009371 A2 | 2/2005 |

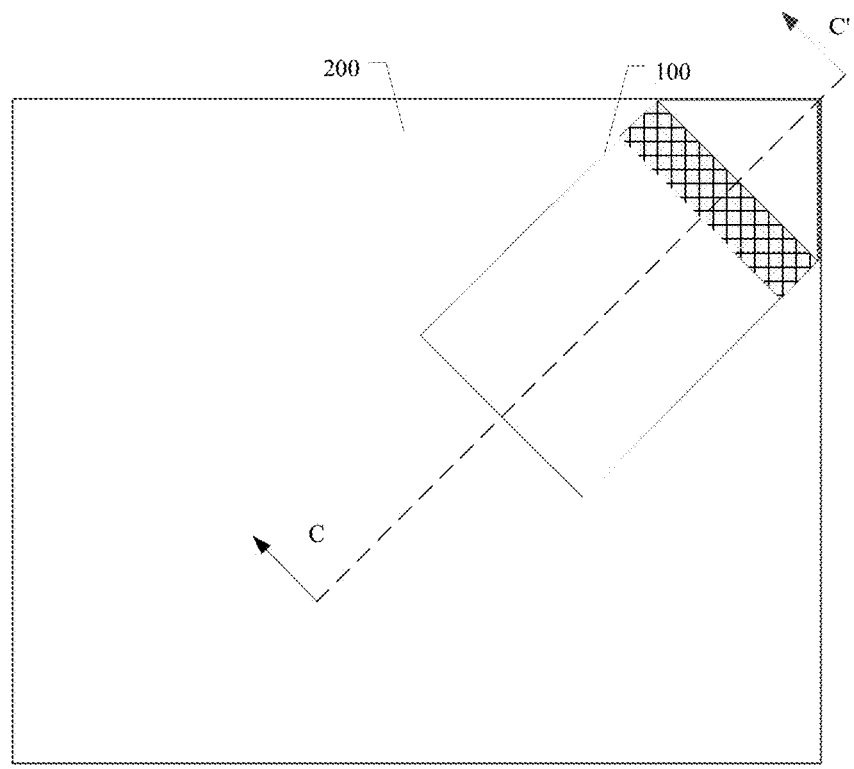
Fig. 4a
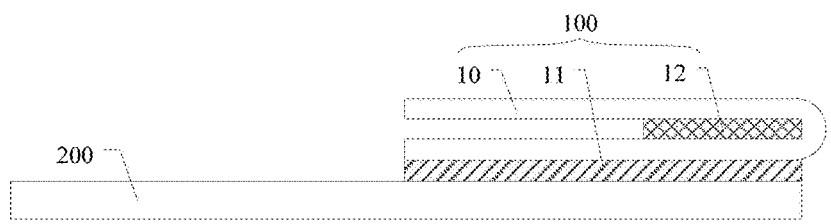
Fig. 4b
S1 — separating the attaching part and the tearing part
S2 — peeling off the protective film
Fig. 5

EASY-TEAR STICKER AND PROTECTIVE FILM ASSEMBLY

The present application claims priority to Chinese patent application No. 201720390211.X, filed on Apr. 14, 2017, the entire disclosure of which is incorporated herein by reference as part of the present application.

TECHNICAL FIELD

Embodiments of the present disclosure relate to an easy-tear sticker and a protective film assembly.

BACKGROUND

With the continuous development of science and technology, applications of electronic equipment in daily life are increasingly widespread. In a process of manufacturing or shipping the electronic equipment, in order to prevent a surface of a screen from being contaminated or scratched, a protective film needs to be disposed on the screen of the electronic equipment. When the protective film needs separating from the screen, the protective film is torn off by an easy-tear sticker. Generally, the easy-tear sticker has a rectangular shape. However, when the protective film is in a shape of concentric rectangle, for example, including inner and an outer rectangle films, the inner rectangle film of the protective film cannot be effectively peeled off by the easy-tear sticker with the rectangular structure, which results in the peel failure, and leads to decrease product performance or produce a failure products.

SUMMARY

At least one embodiment of the present disclosure provides an easy-tear sticker, and the easy-tear sticker comprises: a main body layer and a first adhesive layer. The main body layer comprises an attaching part and a tearing part, and the first adhesive layer is disposed on the attaching part. The attaching part comprises a first attaching area and a second attaching area, a shape of the first attaching area is a right-angle triangle, and a shape of the second attaching area is a strip; the tearing part is connected to the attaching part by a first right-angle side of the right-angle triangle, and the tearing part is configured to be folded toward the attaching part along the first right-angle side, so as to cover a surface of the attaching part facing away from the first adhesive layer.

For example, in the easy-tear sticker provided by an embodiment of the present disclosure, an extending direction of the strip is identical with an extending direction of an angle bisector of a right angle of the right-angle triangle.

For example, in the easy-tear sticker provided by an embodiment of the present disclosure, the right-angle triangle is an isosceles right-angle triangle, and a central line of the strip in the extending direction of the strip coincides with a perpendicular bisector of a hypotenuse of the right-angle triangle.

For example, in the easy-tear sticker provided by an embodiment of the present disclosure, the first tearing part comprises a first tearing area connected to the first right-angle side of the right-angle triangle, in a state in which the tearing part covers the surface of the attaching part facing away from the first adhesive layer, an edge of the first tearing area does not exceed a second right-angle side of the right-angle triangle.

For example, in the easy-tear sticker provided by an embodiment of the present disclosure, the first tearing area and the first attaching area are symmetrical with respect to the first right-angle side.

For example, in the easy-tear sticker provided by an embodiment of the present disclosure, the tearing part further comprises a second tearing area, in the state that the tearing part covers the surface of the attaching part facing away from the first adhesive layer, the second tearing area at least partially covers the second attaching area.

For example, in the easy-tear sticker provided by an embodiment of the present disclosure, the second tearing area and the second attaching area are symmetrical with respect to the first right-angle side.

For example, the easy-tear sticker provided by an embodiment of the present disclosure further comprises a second adhesive layer. The second adhesive layer is disposed on at least one of the tearing part and the attaching part, and the first adhesive layer and the second adhesive layer are respectively disposed on two surfaces of the main body layer, opposite to each other while the main body layer is in an unfolded state.

For example, in the easy-tear sticker provided by an embodiment of the present disclosure, in the state that the tearing part covers the surface of the attaching part facing away from the first adhesive layer, the second adhesive layer is located between the tearing part and the attaching part.

For example, in the easy-tear sticker provided by an embodiment of the present disclosure, the second adhesive layer merely covers a portion of at least one of the tearing part and the attaching part close to the first right-angle side.

For example, in the easy-tear sticker provided by an embodiment of the present disclosure, the second adhesive layer covers a portion of the second attaching area close to the first right-angle side.

For example, in the easy-tear sticker provided by an embodiment of the present disclosure, adhesion of the first adhesive layer is greater than adhesion of the second adhesive layer.

At least one embodiment of the present disclosure provides a protective film assembly, and the protective film assembly comprises: an easy-tear sticker provided by any one of embodiments of the present disclosure, and a protective film. The protective film comprises a right-angle area; the easy-tear sticker is adhered to the right-angle area, and edges of two right-angle sides of the right-angle triangle are flush with edges of two right-angle sides of the right-angle area.

For example, in the protective film assembly provided by an embodiment of the present disclosure, an extending direction of the strip is identical with an extending direction of an angle bisector of a right angle of the right-angle triangle.

For example, in the protective film assembly provided by an embodiment of the present disclosure, an extending direction of the strip is identical with an extending direction of a diagonal of the protective film.

For example, in the protective film assembly provided by an embodiment of the present disclosure, the attaching part is adhered to an area inside an edge of the protective film.

For example, in the protective film assembly provided by an embodiment of the present disclosure, in a state that the tearing part covers the surface of the attaching part facing away from the first adhesive layer, the tearing part is located at the inside of an edge of the protective film.

At least one embodiment of the present disclosure provides an easy-tear sticker and a protective film assembly, the easy-tear sticker is attached to a right-angle area of the protective film, when the protective film is peeled off, a force-bearing position of the protective film is extended from a right-angle vertex of the protective film to two right-angle sides of the protective film. A force-bearing direction of the protective film is substantially along an extending direction of an angle bisector of a right angle of the protective film, so that the force-bearing position, the force-bearing direction of the protective film and the like are more scientific and effective, a success rate of peeling off the protective film being is increased, and work efficiency is increased.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

FIG. 1b is a cross-sectional structural schematic diagram of the easy-tear sticker along a direction of a line W-W' illustrated in FIG. 1a;

FIG. 2b is a cross-sectional structural schematic diagram of the easy-tear protective film along a direction of a line A-A' illustrated in FIG. 2a;

FIG. 3b is a cross-sectional structural schematic diagram of the easy-tear sticker illustrated in FIG. 3a;

FIG. 4a is a planar structural schematic diagram of a protective film assembly provided by an embodiment of the present disclosure;

FIG. 4b is a cross-sectional structural schematic diagram of the protective film assembly along a direction of a line C-C' illustrated in FIG. 4a;

FIG. 5 is a flowchart of an operation method for peeling off a protective film provided by an embodiment of the present disclosure.

DETAILED DESCRIPTION

Figure 1A:
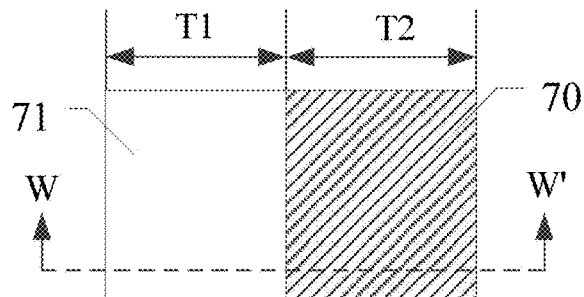
FIG. 1a is a planar structural schematic diagram of an easy-tear sticker.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Each component or structure in the drawings is not drawn in strict accordance with the proportion of rendering, for clarity, the size of each component or structure may be exaggerated or reduced, but these should not be used to limit the scope of the present disclosure. In order to make the following description of the embodiments of the present disclosure clear and concise, the present disclosure omits detailed description of known functions and known components.

Figure 1B:
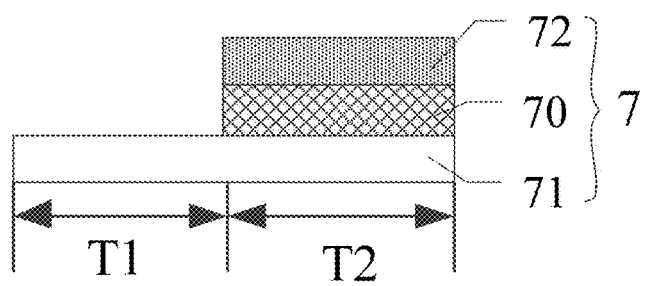

FIG. 1a is a planar structural schematic diagram of an easy-tear sticker, and FIG. 1b is a cross-sectional structural schematic diagram of the easy-tear sticker along a direction of a line W-W' illustrated in FIG. 1a.

For example, as illustrated in FIG. 1a and FIG. 1b, an easy-tear sticker 7 has a rectangular structure, and comprises a substrate 71, an adhesive 70 and a release film 72. The easy-tear sticker 7 is divided into an attaching area T2 and a tearing area T1, the adhesive 70 is disposed in the attaching area T2, the release film 72 is disposed on the adhesive 70 and is aligned with an edge of the adhesive 70. The release film 72 can protect the adhesive 70 from being contaminated.

Figure 2A:
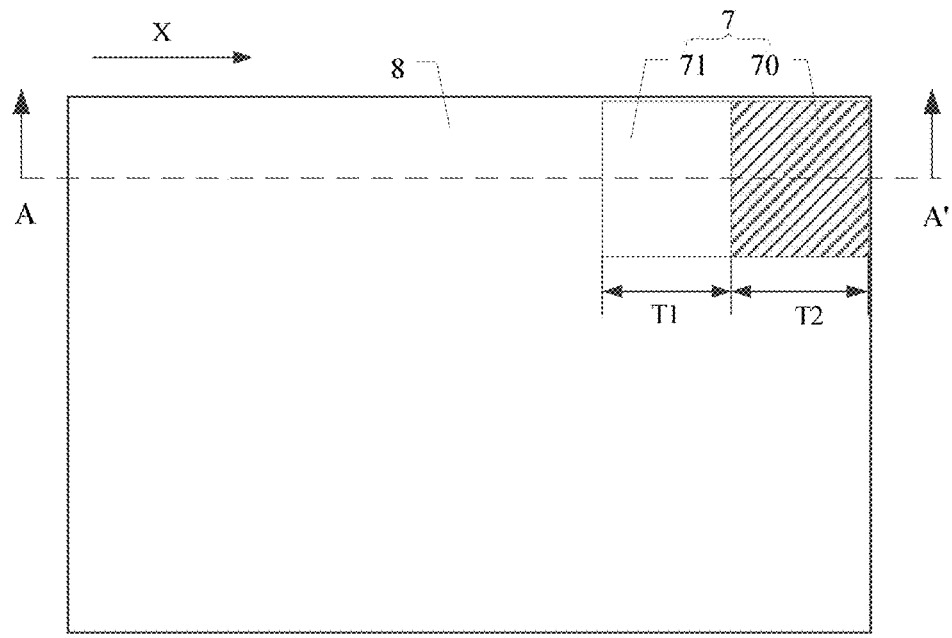
FIG. 2a is a planar structural schematic diagram of an easy-tear protective film.
Figure 2B:
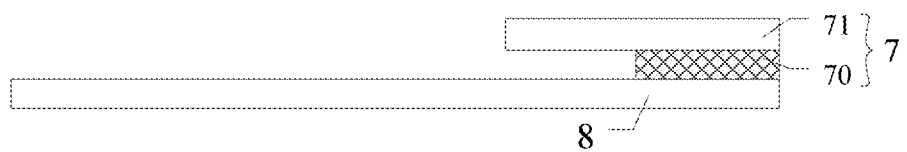
Figure 2C:
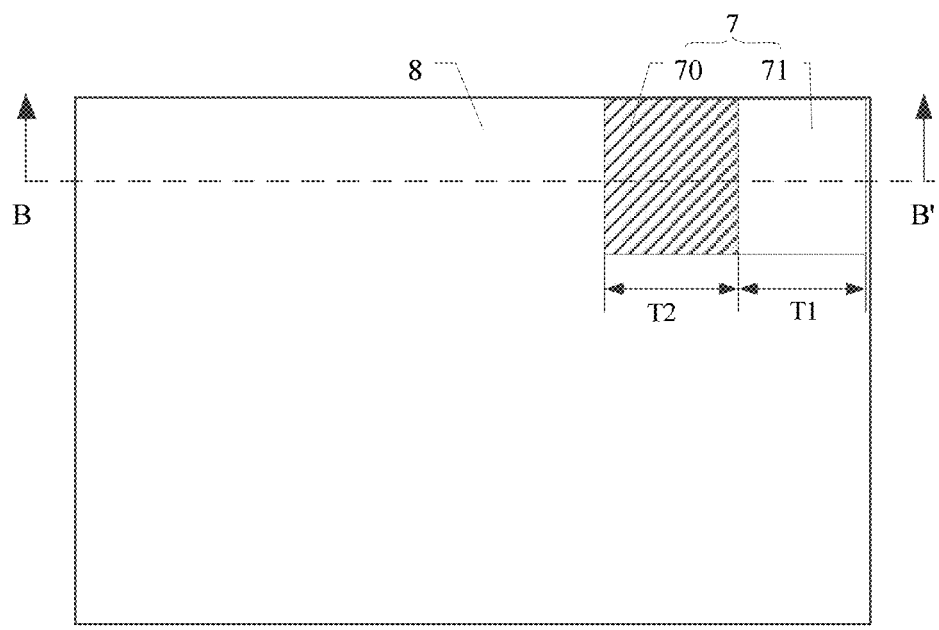
FIG. 2c is another planar structural schematic diagram of an easy-tear protective film.
Figure 2D:
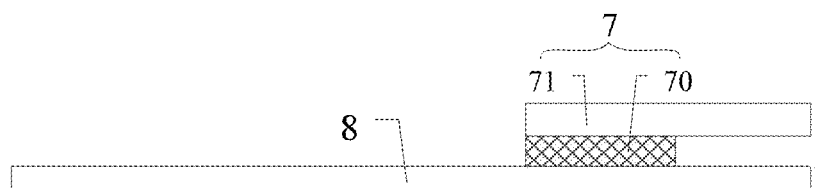
FIG. 2d is a cross-sectional structural schematic diagram of the easy-tear protective film along a direction of a line B-B' illustrated in FIG. 2c.

FIG. 2a is a planar structural schematic diagram of an easy-tear protective film; FIG. 2b is a cross-sectional structural schematic diagram of the easy-tear protective film along a direction of a line A-A' illustrated in FIG. 2a; FIG. 2c is another planar structural schematic diagram of an easy-tear protective film; FIG. 2d is a cross-sectional structural schematic diagram of the easy-tear protective film along a direction of a line B-B' illustrated in FIG. 2c.

For example, as illustrated in FIGS. 2a to 2d, an easy-tear protective film comprises an easy-tear sticker 7 and a protective film 8, the easy-tear sticker 7 may be attached to the protective film 8 by the adhesive 70. When peeling off the protective film 8, a user holds the tearing area T1, and applies a force to the protective film 8 from a boundary between the tearing area T1 and the attaching area T2, so as to peel off the protective film 8.

For example, the easy-tear sticker 7 may be attached to the protective film 8 by two attaching method. FIG. 2a and FIG. 2b illustrate a first attaching method. The first attaching method is that: the attaching area T2 of the easy-tear sticker 7 is attached to the protective film 8 along an edge of the protective film 8; when peeling off the protective film 8, the force-bearing point of the protective film 8 is located at the boundary between the tearing area T1 and the attaching area T2, that is, at the middle of a film surface of the protective film 8, so that the first attaching method is not conducive to peeling off the protective film 8 from the edge of the protective film 8; on the other hand, when peeling off the protective film 8, a force-bearing direction of the protective film 8 is along a X direction, that is, the force is applied along an outward direction of the protective film 8, therefore, the protective film 8 cannot be effectively peeled off. For another example, FIG. 2*c* and FIG. 2*d* illustrate a second attaching method. The second attaching method is that: the attaching area T2 of the easy-tear sticker 7 is attached to the middle of the film surface of the protective film 8, the tearing area T1 is located at the edge of the protective film 8; when peeling off the protective film 8, a gap between the attaching area T2 and the edge of the protective film 8 is existed, therefore, the second attaching method is also not conducive to peeling off the protective film 8 from the edge of the protective film 8, thus the protective film 8 cannot be effectively peeled off.

At least one embodiment of the present disclosure provides an easy-tear sticker, and the easy-tear sticker comprises: a main body layer and a first adhesive layer. The main body layer comprises an attaching part and a tearing part, and the first adhesive layer is disposed on the attaching part. The attaching part comprises a first attaching area and a second attaching area, a shape of the first attaching area is a right-angle triangle, and a shape of the second attaching area is a strip; the tearing part is connected to the attaching part by a first right-angle side of the right-angle triangle, and the tearing part is configured to be folded toward the attaching part along the first right-angle side, so as to cover a surface of the attaching part facing away from the first adhesive layer.

At least one embodiment of the present disclosure further provides a protective film assembly, and the protective film assembly comprises: an easy-tear sticker provided by any one of embodiments of the present disclosure, and a protective film. The protective film comprises a right-angle area; the easy-tear sticker is adhered to the right-angle area, and edges of two right-angle sides of the right-angle triangle of the first attaching area are flush with edges of two right-angle sides of the right-angle area.

The easy-tear sticker provided by embodiments of the present disclosure can be adhered to a right-angle area of the protective film, when peeling off the protective film, a force-bearing position of the protective film can be extended from a right-angle vertex of the protective film to two right-angle sides of the protective film, a force-bearing direction of the protective film can be substantially along an extending direction of an angle bisector of a right angle of the protective film, so that the force-bearing position, the force-bearing direction of the protective film and the like are more scientific and effective, the success rate of peeling off the protective film is increased, and the work efficiency is increased.

Several embodiments of the present disclosure are described in details below, but the present disclosure is not limited to these specific embodiments.

In the following descriptions of the embodiments of the present disclosure, "unfolded state" refers to a state in which the tearing part is not adhered to the attaching part, "folded state" refers to a state in which the tearing part covers on a surface of the attaching part facing away from a first adhesive layer, for example, "folded state" may be a state in which the tearing part is adhered to the surface of the attaching part facing away from the first adhesive layer through a second adhesive layer.

In the following descriptions of the embodiments of the present disclosure, "direction being identical" means that two extending directions are substantially the same. For example, two directions are perfectly parallel to each other; or the two directions are approximately parallel to each other.

Figure 3A:
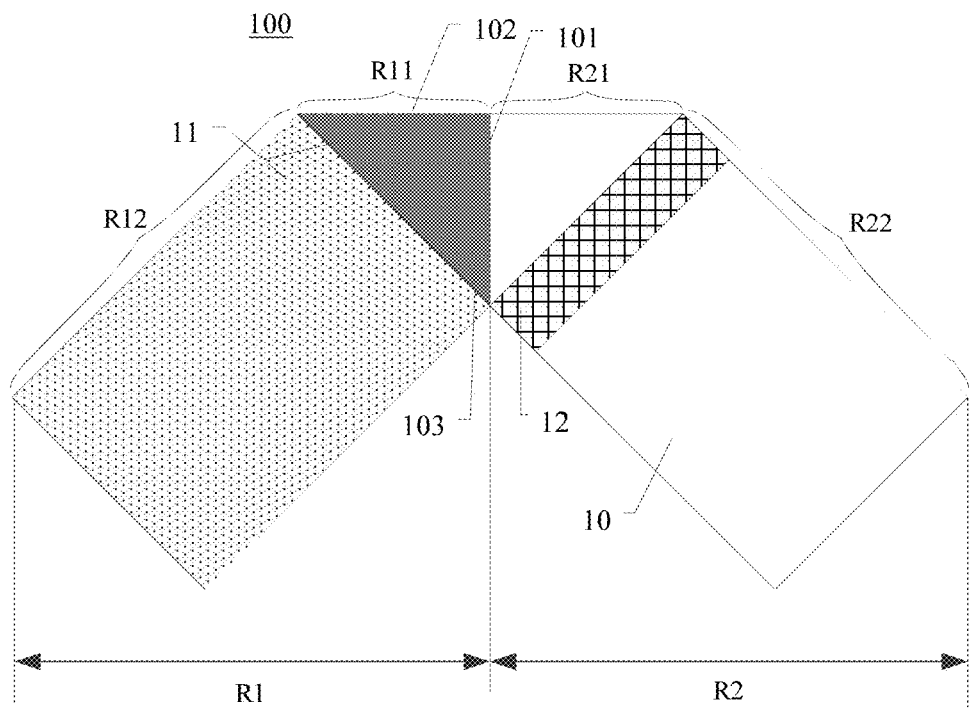
FIG. 3a is a planar structural schematic diagram of an easy-tear sticker provided by an embodiment of the present disclosure.
Figure 3B:
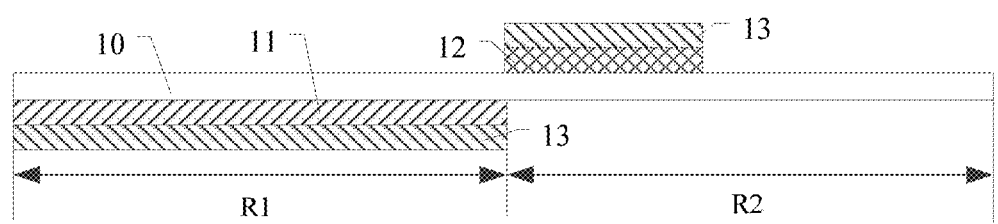

An embodiment of the present disclosure provides an easy-tear sticker. FIG. 3*a* is a planar structural schematic diagram of an easy-tear sticker provided by an embodiment of the present disclosure; FIG. 3*b* is a cross-sectional structural schematic diagram of the easy-tear sticker illustrated in FIG. 3*a*.

For example, as illustrated in FIG. 3*a* and FIG. 3*b*, an easy-tear sticker 100 comprises: a main body layer 10 and a first adhesive layer 11. The main body layer 10 comprises an attaching part R1 and a tearing part R2, and the first adhesive layer 11 is disposed on the attaching part R1. The attaching part R1 comprises a first attaching area R11 and a second attaching area R12, a shape of the first attaching area R11 is a right-angle triangle, and a shape of the second attaching area R12 is a strip, an extending direction of the strip, for instance, is identical with an extending direction of an angle bisector of a right angle of the right-angle triangle. The tearing part R2 is connected to the attaching part R1 by a first right-angle side 101 of the right-angle triangle, and the tearing part R2 is configured to be folded toward the attaching part R1 along the first right-angle side 101, so as to cover a surface of the attaching part R1 facing away from the first adhesive layer 11. FIG. 3*a* and FIG. 3*b* are schematic diagrams of the easy-tear sticker 100 in an unfolded state. In a folded state, for example, the tearing part R2 may be folded leftward along the first right-angle side 101 illustrated in FIG. 3*a*, and may cover the surface of the attaching part R1 facing away from the first adhesive layer 11.

The first attaching area of the easy-tear sticker provided by an embodiment of the present disclosure is adhered to a right-angle area of a protective film and be flush with edges of two right-angle sides of the right-angle area. When peeling off the protective film, a force-bearing position of the protective film can be extended from a right-angle vertex of the protective film to two right-angle sides of the protective film, a force-bearing direction of the protective film can be substantially along an extending direction of an angle bisector of a right angle of the protective film, so that the force-bearing position, the force-bearing direction of the protective film and the like are more scientific and effective. The second attaching area can increase an adhering area, so as to increase the adhesion between the easy-tear sticker and the protective film, prevent the easy-tear sticker from being dropped from the protective film when peeling off the protective film, and increase the success rate of peeling off the protective film.

For example, the easy-tear sticker 100 provided by the embodiments of the present disclosure may be applied to various types of protective films. The protective film may be a functional protective film or a non-functional protective film. The functional protective film may comprise an anti-reflection protective film, an anti-light-reflection protective film, an anti-peeping protective film, a high-definition anti-scratching protective film, and the like, and the embodiments of the present disclosure are not limited thereto. For example, an anti-reflection layer may be formed on a protective film, the anti-reflection layer may be a multi-layer thin film composed of high refractive index layer and low refractive index layer, so that the protective film can have an anti-reflection function.

For example, a material of the main body layer 10 may be a polyethylene terephthalate (PET) base material, a polyethylene (PE) base material, a polyvinyl chloride (PVC) base material, or the like.

For example, the first right-angle side 101 and a second right-angle side 102 of the right-angle triangle are perpendicular to each other, and "perpendicular" comprises strict perpendicular, or approximate perpendicular. A right angle of the right-angle triangle, for example, may be a fillet right angle, so that the easy-tear sticker 100 can be applied to the peeling off a fillet-angle type protective film.

For example, the right-angle triangle may be an isosceles right-angle triangle, the strip may be a rectangular, a central line in the extending direction of the strip coincides with a perpendicular bisector of a hypotenuse 103 of the right-angle triangle, that is, the central line in the extending direction of the strip coincides with an angle bisector of a right angle of the right-angle triangle, so that a shape of the attaching part R1 is a symmetrical pentagon. With this symmetrical structure, the force-bearing direction of the protective film is more uniform when the protective film is peeled off by an easy-tear sticker. It should be noted that, in the embodiments of the present disclosure, "coinciding" means substantial coinciding or strict coinciding.

For example, in a direction perpendicular to the extending direction of the second attaching area R12, two sides of the second attaching area R12 that are opposite to each other may be a straight-line, curved-line, zigzag line, or in other regular or irregular shape, so that a shape of the second attaching area R12 may be a polygon, a semi-ellipse, an arch, and the like, and the polygon may comprise a quadrangle (such as, a rectangle, a trapezoid) or the like.

For example, the first adhesive layer 11 may completely cover one of surfaces of the attaching part R1, so that the attaching part R1 may be completely adhered on the protective film, thereby preventing the attaching part R1 from warping, bending and other deformation.

For example, a material of the first adhesive layer 11 may be an organic adhesive. The organic adhesive, for example, may comprise natural polymers, organic silica gel, an epoxy resin, polyurethane, polyester fiber, a polypropylene resin, a polyethylene resin, an acrylic resin, or the like. The material of the first adhesive layer 11 may further comprise an inorganic adhesive. The inorganic adhesive, for instance, may comprise sodium silicate, phosphate adhesives, silicate adhesives, sulfate adhesives, borate adhesives, or the like.

For example, as illustrated in FIG. 3a, the tearing part R2 may comprise a first tearing area R21 connected to the first right-angle side 101 of the right-angle triangle. In the state in which the tearing part R2 covers the surface of the attaching part R1 facing away from the first adhesive layer 11, an edge of the first tearing area R21 does not exceed a second right-angle side 102 of the right-angle triangle. For example, in a case that the easy-tear sticker 100 is in a folded state, the first tearing area R21 of the tearing part R2 completely falls into the first attaching area R11 of the attaching part R1.

For example, the first tearing area R21 and the first attaching area R11 are symmetrical with respect to the first right-angle side 101, so that a shape of the first tearing area R21 is the same as a shape of the first attaching area R11, that is, the shape of the first tearing area R21 is also a right-angle triangle. In the state in which the tearing part R2 covers the surface of the attaching part R1 facing away from the first adhesive layer 11, the first tearing area R21 completely overlaps with the first attaching area R11. It should be noted that, the shape of the first tearing area R21 may also be different from the shape of the first attaching area R11, for example, the shape of the first tearing area R21 may also be an acute-angle triangle, a rectangle and the like.

For example, the tearing part R2 may further comprise a second tearing area R22, in the state in which the tearing part R2 covers the surface of the attaching part R1 facing away from the first adhesive layer 11, the second tearing area R22 at least partially covers the second attaching area R12. When the protective film is peeled off, an operator can hold the second tearing area R22 to conveniently control the force-bearing direction and force-bearing position of the protective film.

For example, the second tearing area R22 and the second attaching area R12 may be symmetrical with respect to the first right-angle side 101, so that a shape of the second tearing area R22 and a shape of the second attaching area R12 are identical with each other. The shape of the second tearing area R22 and the shape of the second attaching area R12 may also be different. For example, the shape of the second tearing area R22 may be in a T shape, a cross-sectional area of the second tearing area R22 at a side of the second tearing area R22 away from the first tearing area R21 is larger than a cross-sectional area at another side of the second tearing area R22 close to the first tearing area R21, so as to increase the area of the easy-tear sticker 100 held by the operator, facilitate the operator to hold the easy-tear sticker 100, and increase the efficiency of peeling off a film.

For example, the first tearing area R21 and the first attaching area R11 are symmetrical with respect to the first right-angle side 101, the second tearing area R22 and the second attaching area R12 are also symmetrical with respect to the first right-angle side 101, so that the attaching part R1 and the tearing part R2 are symmetrical with respect to the first right-angle side 101, that is, the tearing part R2 may be folded toward the attaching part R1 along the first right-angle side 101 so as to completely overlap the attaching part R1.

For example, a color of the tearing part R2 and a color of the attaching part R1 may be the same, also may be different from each other. For example, the attaching part R1 may be colorless and transparent, the color of the tearing part R2 may be red, so that the recognition degree of the tearing part R2 is increased, the operator can quickly and accurately find the tearing part R2, and the work efficiency is increased. It should be noted that, the color of the attaching part R1 and the color of the tearing part R2 may be designed according to actual situations, and the embodiments of the present disclosure are not limited thereto.

For example, as illustrated in FIG. 3b, the easy-tear sticker 100 may further comprise a second adhesive layer 12. The second adhesive layer 12 may be disposed on at least one of the tearing part R2 and the attaching part R1. In a case that the main body layer 10 is in an unfolded state, the first adhesive layer 11 and the second adhesive layer 12 are respectively disposed on two surfaces of the main body layer 10 opposite to each other.

For example, in a state in which the tearing part R2 covers the attaching part R1, the second adhesive layer 12 may be located between the tearing part R2 and the attaching part R1, and the second adhesive 12 may fix the tearing part R2 on the attaching part R1, and prevent the tearing part R2 from warping, bending or other deformation.

For example, the second adhesive layer 12 merely covers a part of the tearing part R2 and/or the attaching part R1 close to the first right-angle side 101. When the tearing part R2 is adhered to the attaching part R1 by a second adhesive layer 12, the tearing part R2 may have a portion that is not fixed by the second adhesive layer 12, so as to facilitate the operator to hold the portion not fixed by the second adhesive layer 12 to separate the tearing part R2 and the attaching part R1.

For example, the second adhesive layer 12 may cover a portion of the second tearing area R22 and/or the second attaching area R12 close to the first right-angle side 101. As illustrated in FIG. 3a, the second adhesive layer 12 may be disposed on a side of the second tearing area R22 close to the first tearing area R21. When the main body layer 10 is in the folded state, a portion of the second tearing area R22 away from the first tearing area R21 is not fixed to the attaching part R1 by the second adhesive layer 22, therefore, the operator can hold the portion of the second tearing area R22 away from the first tearing area R21 to separate the tearing part R2 and the attaching part R1.

For example, adhesion of the first adhesive layer 11 is greater than adhesion of the second adhesive layer 12. The tearing part R2 is adhered to the attaching part R1 through the second adhesive layer 12, the easy-tear sticker 100 is adhered to the protective film through the first adhesive layer 11. In this way, when separating the tearing part R2 and the attaching part R1, the easy-tear sticker 100 can be firmly adhered to the protective film.

For example, a material of the second adhesive layer 12 may be the same as or different from a material of the first adhesive layer 11. In a case that the material of the second adhesive layer 12 is the same as the material of the first adhesive layer 11, parameters of a material can be controlled, so as to ensure that the adhesion of the first adhesive layer 11 is greater than the adhesion of the second adhesive layer 12. For example, for a polymer material, the parameters of the material may comprise, for instance, polarity of the molecule surface, polymerization degree of the molecule, crystallinity of the molecule, a filler material and the like. For example, when the first adhesive layer 11 and the second adhesive layer 12 both are polyethylene resins, the surface of the polyethylene resin of the first adhesive layer 11 may be performed using plasma process, a polar group (such as, a hydroxyl group, a carbonyl group or a carboxyl group) is formed on the surface of the polyethylene resin of the first adhesive layer 11, so that the adhesive strength of the polyethylene resin is increased, and the adhesion of the first adhesive layer 11 is also increased.

For example, as illustrated in FIG. 3b, the easy-tear sticker 100 further comprises a release film 13. The release film 13 may completely cover the first adhesive layer 11 and be flush with the edge of the first adhesive layer 11, so as to insulate and protect the first adhesive layer 11, and prevent the first adhesive layer 11 from being contaminated by abnormal substances and losing adhesiveness.

For example, the release film 13 may be a PE release film or the like. The release film 13 may be provided with different colors (such as, yellow, etc.). When attaching the easy-tear sticker 100, an operator can quickly and accurately find out a position of the first adhesive layer 11, and the work efficiency is increased.

For example, the release film 13 may be further disposed on the second adhesive layer 12, so as to insulate and protect the second adhesive layer 12, and prevent the second adhesive layer 12 from being contaminated. It should be noted that, during shipping, the easy-tear sticker 100 may be in an unfolded state or in a folded state. In a case that the easy-tear sticker 100 is in the folded state, the second adhesive layer 12 may be disposed between the tearing part R2 and the attaching part R1, so as to fix the tearing part R2 to the attaching part R1, therefore, the release film 13 is not disposed on the second adhesive layer 12. However, as illustrated in FIG. 3a and FIG. 3b, in a case that the easy-tear sticker 100 is in the unfolded state, the release film 13 needs to be disposed on the second adhesive layer 12 to protect the second adhesive layer 12.

An embodiment of the present disclosure further provides a protective film assembly, and the protective film assembly has advantages of simple structure, convenient operation and easy removal. FIG. 4a is a planar structural schematic diagram of a protective film assembly provided by an embodiment of the present disclosure, FIG. 4b is a cross-sectional structural schematic diagram of the protective film assembly along a direction of a line C-C' illustrated in FIG. 4a.

For example, as illustrated in FIG. 4a and FIG. 4b, a protective film assembly comprises an easy-tear sticker 100 provided by any one of the above embodiments, and a protective film 200. The protective film 200 comprises a right-angle area; the easy-tear sticker 100 is adhered to the right-angle area, and edges of two right-angle sides of the right-angle triangle are flush with edges of two right-angle sides of the right-angle area of the protective film 200. An extending direction of the strip of the easy-tear sticker 100 is identical with an extending direction of an angle bisector of a right angle of the right-angle triangle.

For example, a shape of the protective film 200 may be a rectangle, a scallop, a concentric rectangles, or the like.

For example, an extending direction of an angle bisector of a right angle of the right-angle area of the protective film 200 may be the same as the extending direction of the angle bisector of the right angle of the right-angle triangle of the easy-tear sticker 100, so that a second attaching area of the easy-tear sticker 100 may be adhered on the protective film 200 along the extending direction of the angle bisector of the right angle the right-angle area of the protective film 200. When peeling off the protective film 200, a force-bearing direction of the protective film 200 can be extended from a right-angle vertex of the right-angle area of the protective film 200 to two right-angle sides of the right-angle area of the protective film 200, the force-bearing direction of the protective film 200 may be substantially along the extending direction of the angle bisector of the right-angle area of the protective film, force applied to two right-angle sides of the right-angle area of the protective film can be more uniform and balanced, and the force-bearing direction, force-bearing position and the like are more conducive to peeling off the protective film, so as to increase the success rate of peeling off the protective film and increase the work efficiency.

For example, a material of the protective film 200 may be polypropylene (PP), polyvinyl chloride (PVC), polyethylene (PE), polyethylene terephthalate (PET), ortho-phenylphenol (OPP), optical adhesive (OCA), or the like.

For example, the protective film 200 may be formed by a blow molding method, a tape casting method, a calendering method, or the like.

For example, the protective film 200 comprises a third adhesive layer. The protective film 200 may be adhered to a panel through the third adhesive layer, so as to protect the panel. For example, adhesion of the first adhesive layer 11 needs to be greater than adhesion of the third adhesive layer, therefore, when the protective film 200 is peeled off, the easy-tear sticker 100 can be firmly adhered to the protective film 200, so as to prevent the easy-tear sticker 100 from dropping from the protective film 200, and increasing the success rate of peeling off the protective film 200.

For example, the attaching part is adhered to an area inside an edge of the protective film 200. As illustrated in FIG. 4a, in a state in which the tearing part covers the surface of the attaching part facing away from the first adhesive layer 11, the tearing part may be located in an area inside the edge of the protective film 200, so that the easy-tear sticker 100 does not affect the process performed at the periphery of the protective film 200.

For example, as illustrated in FIG. 4b, the tearing part may be adhered to the surface of the attaching part facing away from the first adhesive layer 11 through the second adhesive layer 12, so as to prevent the tearing part from warping, bending or other deformation. It should be noted that, in a process of manufacturing a product, because functions of respective regions on a surface of the product are different from one another, the different regions need to be processed differently, therefore different types of protective films, such as a concentric rectangles ("回" shaped) protective film, are needed to protect different regions in different stages. The concentric-rectangular protective film may comprise an inner rectangle protective film and an outer rectangle protective film surrounding the inner rectangle protective film, the outer rectangle protective film and the inner rectangle protective film are spaced from each other. The protective film 200 of the protective film assembly provided by an embodiment of the present disclosure may be an inner rectangle protective film. Both the tearing part and the attaching part of the easy-tear sticker 100 may be located inside the edge of the inner protective film, and the tearing part can be adhered to the attaching part through the second adhesive layer 12 to prevent the tearing part from warping, bending or other deformation, so as to avoid that the tearing part is located at a space beyond an area defined by the inner rectangle protection film, therefore the easy-tear sticker 100 may not affect the peeling of the outer rectangle protective film. On the other hand, when performing treatment on the area corresponding to the outer rectangle protective film, the easy-tear sticker 100 may not affect the treatment operation.

For example, the protective film assembly may be a plastic protective film, an electronic product protective film, an automobile protective film, or the like. An electronic product may comprise a television, a digital camera, a mobile phone, a watch, a tablet, a notebook computer, a navigator, and the like.

An embodiment of the present disclosure further comprises a protective film assembly.

For example, the protective film assembly comprises a protective film and an easy-tear sticker. The protective film comprises a right-angle area. The easy-tear sticker comprises a main body layer and a first adhesive layer. The main body layer comprises an attaching part and a tearing part, and the first adhesive layer is disposed on the attaching part. The attaching part comprises a first attaching area and a second attaching area, a shape of the first attaching area is a right-angle triangle, and a shape of the second attaching area is a strip; the tearing part is connected to the attaching part by a first right-angle side of the right-angle triangle, and is configured to be folded toward the attaching part along the first right-angle side, so as to cover a surface of the attaching part facing away from the first adhesive layer. The easy-tear sticker is adhered to the right-angle area, and edges of two right-angle sides of the right-angle triangle of the easy-tear sticker are flush with edges of two right-angle sides of the right-angle area of the protective film. An extending direction of the strip of the easy-tear sticker is identical with an extending direction of a diagonal of the protective film; or the extending direction of the strip of the easy-tear sticker is identical with an extending direction of an angle bisector of a right angle of the right-angle area of the protective film.

Different from the protective film assembly described in the above embodiments, in the embodiment, the extending direction of the strip of the easy-tear sticker may further be the same as the extending direction of the diagonal of the protective film.

For example, in a case that a shape of the protective film is a rectangle, the extending direction of the strip of the easy-tear sticker may be the same as the extending direction of the diagonal of the protective film, so that the second attaching area of the easy-tear sticker may be adhered to the protective film along the extending direction of the diagonal of the protective film. When peeling off the protective film, a force-bearing direction of the protective film may be along a diagonal direction of the protective film.

For example, the extending direction of the diagonal of the protective film or the extending direction of the angle bisector of the right angle of the right-angle area may be different from the extending direction of the angle bisector of the right angle of the right-angle triangle. For example, the extending direction of the angle bisector of the right angle of the right-angle area of the protective film is the same as the extending direction of the angle bisector of the right angle of the right-angle triangle, and the extending direction of the diagonal of the protective film is the same as an extending direction of a perpendicular line of a hypotenuse of the right-angle triangle.

It should be noted that, in the embodiments of the present disclosure, in a case that the shape of the protective film is the scallop shape, "diagonal" may be a straight line extending from a right-angle vertex of the right-angle area to a middle point of a circular arc corresponding to the right-angle area; "diagonal" may also be a diagonal of a rectangle defined by the two right-angle sides of the right-angle area.

In the embodiments of the present disclosure, relevant detailed descriptions of the type and the manufacturing method of the protective film, the position relationship between the protective film and the easy-tear sticker and the like may be referred to the related descriptions in the embodiments of the above protective film assembly, and detailed descriptions of the easy-tear sticker may be referred to the related descriptions in the embodiments of the above easy-tear sticker, and similar descriptions will be omitted here.

Figure 6A:
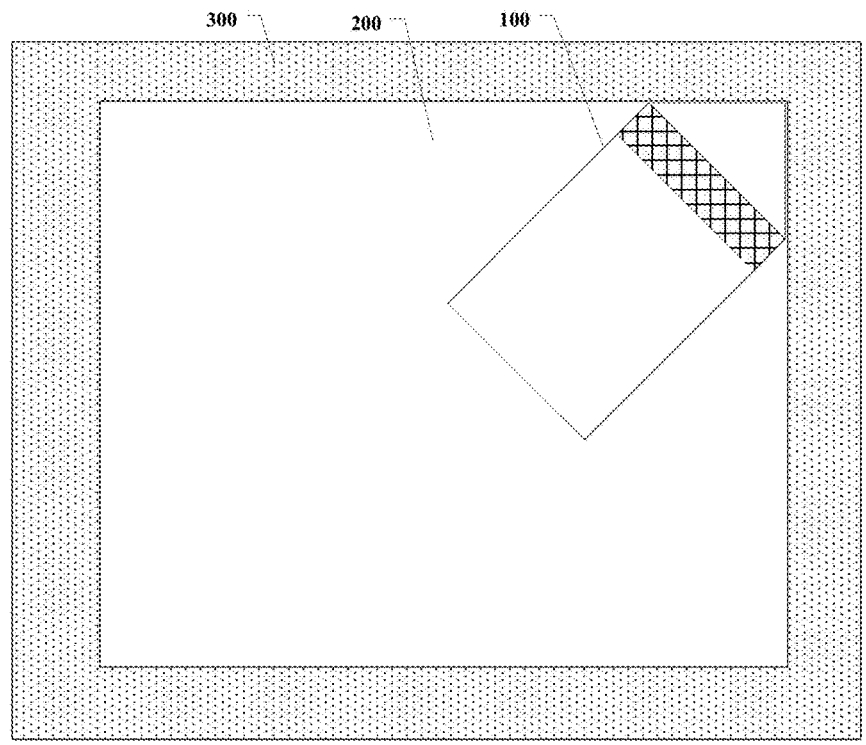
FIGS. 6a to 6c illustrate the process steps of an operation method for peeling off a protective film provided by an embodiment of the present disclosure.
Figure 6B:
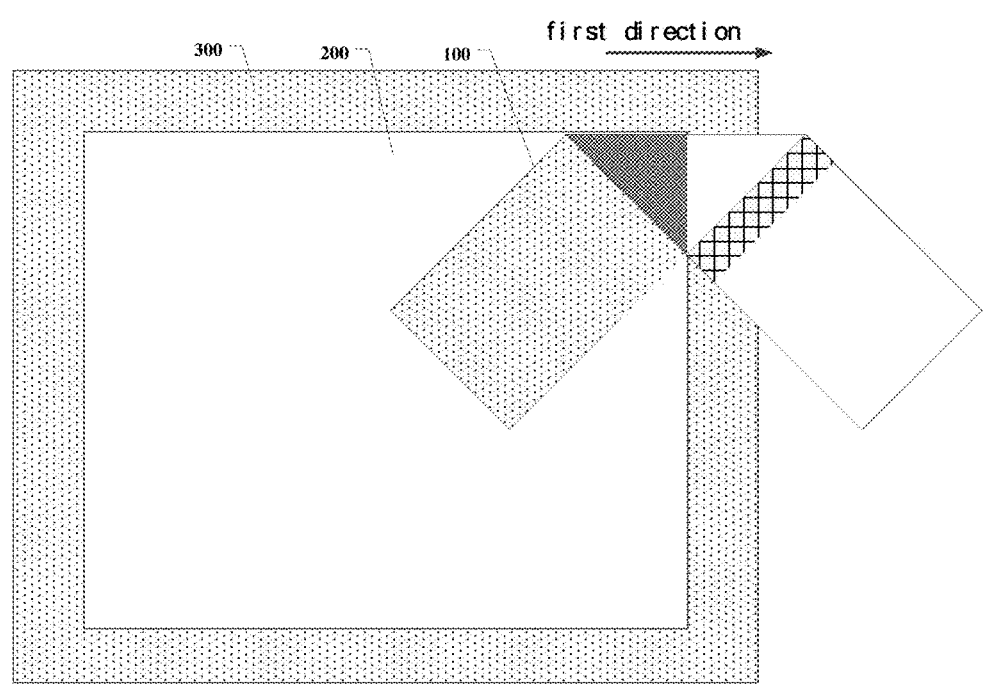
Figure 6C:
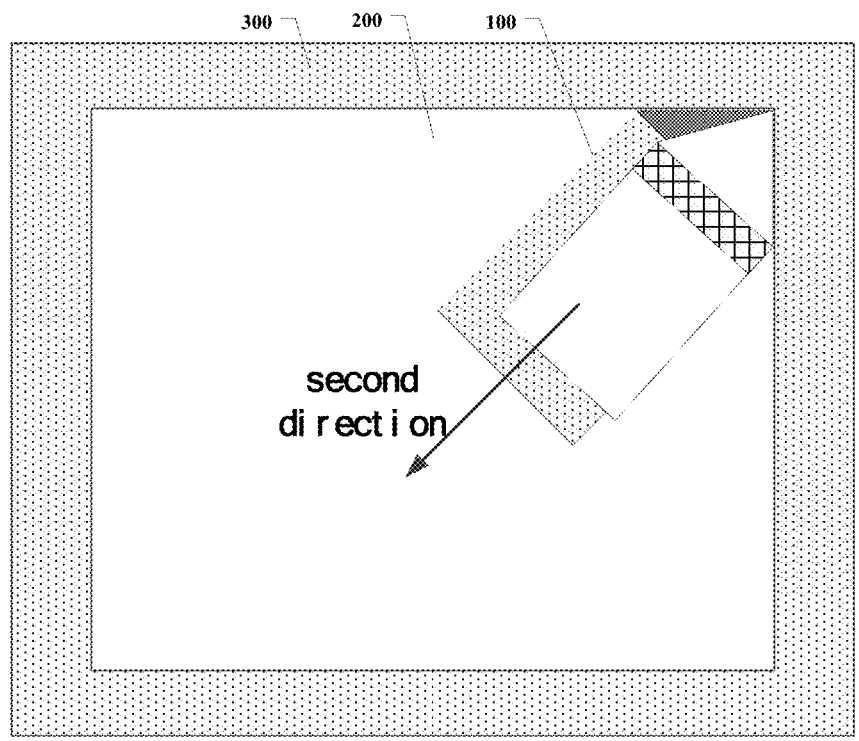

An embodiment of the present disclosure further provides an operation method for peeling off a protective film assembly provided by the above embodiments of the protective film assembly. FIG. 5 is a flowchart of an operation method for peeling off a protective film provided by an embodiment of the present disclosure; FIGS. 6a to 6c illustrate various step processes of an operation method for peeling off a protective film provided by an embodiment of the present disclosure.

For example, as illustrated in FIG. 5, the operation method provided by an embodiment of the present disclosure comprises following steps:

S1, separating the attaching part and the tearing part;

S2, peeling off the protective film.

The operation method of the embodiments of the present disclosure will be described in detail below by taking the protective film having a rectangular structure as an example.

For example, as illustrated in FIG. 6a, the protective film assembly may be disposed on a panel 300. The easy-tear sticker 100 is adhered to the right-angle area of the protective film 200, and the tearing part of the easy-tear sticker 100 is adhered to the attaching part by the second adhesive layer, for example, the tearing part and the attaching part may be mirror-symmetrical, so that the tearing part and the attaching part completely overlap with each other.

For example, the easy-tear sticker 100 may be adhered to the protective film 200 along the extending direction of the diagonal of the protective film 200 or along the extending direction of the angle bisector of the right angle of the right-angle area.

For example, the panel 200 may be a metal panel or a non-metal panel. The non-metal panel may be, for example, a glass panel, a quartz panel, a ceramic panel, a plastic panel, a silicone panel, or the like. For another example, the non-metal panel may also be a panel provided with a functional component, such as a liquid crystal display panel, an organic light-emitting display panel or the like. The metal panel may be, for example, an electro-galvanized steel plate, a hot-dip galvanized steel plate, an aluminum-galvanized steel plate, a copper plate or the like.

For example, as illustrated in FIG. 6b, holding and pulling the tearing part along a first direction, so as to separate the tearing part and the attaching part.

For example, as illustrated in FIG. 6c, holding and pulling the tearing part along a second direction, so that a force is applied to the protective film 200 from the right-angle vertex of the protective film 200 by the tearing part, the force-bearing position of the protective film 200 extends from the right-angle vertex of the protective film 200 to the two right-angle sides of the protective film 200, so as to peel off the protective film 200 from the panel 300.

For example, the second direction may be an extending direction of the diagonal of the protective film 200, and the second direction may also be an extending direction of the angle bisector of the right angle of the right-angle area of the protective film 200.

It should be noted that, in the protective film assembly of the above embodiments, the easy-tear sticker 100 and the protective film 200 may be integrated. In a case that the easy-tear sticker 100 and the protective film 200 are not integrated, the operation method may further comprise adhering the easy-tear sticker to the protective film. For example, when the easy-tear sticker 100 is in the folded state, the release film on the first adhesive layer is first tore off, the edges of the two right-angle sides of the right-angle triangle are aligned with the edges of the two right-angled sides of the right-angle area of the protective film 200, and then the attaching part is adhered to the right-angle area, so as to form the protective film assembly; for another example, when the easy-tear sticker 100 is in the unfolded state, the release film on the first adhesive layer is first tore off, the edges of the two right-angle sides of the right-angle triangle are aligned with the edges of the two right-angled sides of the right-angle area of the protective film 200, and then the attaching part is adhered to the right-angle area; next the release film on the second adhesive layer is tore off, the tearing part is folded toward the attaching part along the first right-angle side to cover the attaching part, finally the tearing part and the attaching part are adhered together through the second adhesive layer to form the protective film assembly.

For the present disclosure, the following statements should be noted:

(1) the accompanying drawings involve only the structure(s) in connection with the embodiment(s) of the present disclosure, and other structure(s) can be referred to in common design(s);

(2) for the purpose of clarity only, in accompanying drawings for illustrating the embodiment(s) of the present disclosure, the thickness a layer or area may be enlarged or narrowed, that is, the drawings are not drawn in a real scale;

(3) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. An easy-tear sticker, comprising: a main body layer and a first adhesive layer, the main body layer comprising an attaching part and a tearing part, and the first adhesive layer being disposed on the attaching part,
   wherein the attaching part comprises a first attaching area and a second attaching area, a shape of the first attaching area is a right-angle triangle, and a shape of the second attaching area is a strip; the tearing part is connected to the attaching part by a first right-angle side of the right-angle triangle, and is configured to be folded toward the attaching part along the first right-angle side, so as to cover a surface of the attaching part facing away from the first adhesive layer.

2. The easy-tear sticker according to claim 1, wherein an extending direction of the strip is identical with an extending direction of an angle bisector of a right angle of the right-angle triangle.

3. The easy-tear sticker according to claim 1, wherein the right-angle triangle is an isosceles right-angle triangle, and a central line of the strip in the extending direction of the strip coincides with a perpendicular bisector of a hypotenuse of the right-angle triangle.

4. The easy-tear sticker according to claim 1, wherein the tearing part comprises a first tearing area connected to the first right-angle side of the right-angle triangle, an edge of the first tearing area is within a second right-angle side of the right-angle triangle.

5. The easy-tear sticker according to claim 4, wherein the first tearing area and the first attaching area are symmetrical with respect to the first right-angle side.

6. The easy-tear sticker according to claim 4, wherein the tearing part further comprises a second tearing area, the second tearing area at least partially covers the second attaching area.

7. The easy-tear sticker according to claim 6, wherein the second tearing area and the second attaching area are symmetrical with respect to the first right-angle side.

8. The easy-tear sticker according to claim 1, further comprising a second adhesive layer;
   wherein the second adhesive layer is disposed on at least one of the tearing part and the attaching part, and the first adhesive layer and the second adhesive layer are respectively disposed on two surfaces of the main body layer opposite to each other while the main body layer is in an unfolded state.

9. The easy-tear sticker according to claim 8, wherein the second adhesive layer is located between the tearing part and the attaching part.

10. The easy-tear sticker according to claim 8, wherein the second adhesive layer covers a portion of at least one of the tearing part and the attaching part close to the first right-angle side.

11. The easy-tear sticker according to claim 8, wherein the second adhesive layer covers a portion of the second attaching area close to the first right-angle side.

12. The easy-tear sticker according to claim 8, wherein adhesion of the first adhesive layer is greater than adhesion of the second adhesive layer.

13. A protective film assembly, comprising:
an easy-tear sticker according to claim 1;
a protective film, comprising a right-angle area;
wherein the easy-tear sticker is adhered to the right-angle area, and edges of two right-angle sides of the right-angle triangle are flush with edges of two right-angle sides of the right-angle area.

14. The protective film assembly according to claim 13, wherein an extending direction of the strip is identical with an extending direction of an angle bisector of a right angle of the right-angle triangle.

15. The protective film assembly according to claim 13, wherein an extending direction of the strip is identical with an extending direction of a diagonal of the protective film.

16. The protective film assembly according to claim 13, wherein the attaching part is adhered to an area inside an edge of the protective film.

17. The protective film assembly according to claim 13, wherein the tearing part is located inside an edge of the protective film.

\* \* \* \* \*